March 17, 1931.  G. T. MARKEY  1,796,872

EGG TRAY AND EGG TILTING MECHANISM

Filed July 9, 1928 2 Sheets-Sheet 1

INVENTOR.
George T. Markey
BY
Erwin Wheeler & Woolard
ATTORNEYS.

March 17, 1931. G. T. MARKEY 1,796,872
EGG TRAY AND EGG TILTING MECHANISM
Filed July 9, 1928 2 Sheets-Sheet 2

INVENTOR.
George T. Markey
BY
Erwin, Wheeler & Woolard
ATTORNEYS.

Patented Mar. 17, 1931

1,796,872

UNITED STATES PATENT OFFICE

GEORGE T. MARKEY, OF FORT ATKINSON, WISCONSIN, ASSIGNOR TO JAMES MANUFACTURING COMPANY, OF FORT ATKINSON, WISCONSIN, A CORPORATION OF WISCONSIN

EGG TRAY AND EGG-TILTING MECHANISM

Application filed July 9, 1928. Serial No. 291,289.

My invention relates to improvements in incubator egg holding and egg tilting devices, with particular reference to incubators of that type in which the eggs may be tilted by mechanical means operable from a point exterior to the incubator.

The primary object of this invention is to provide improved means for holding the eggs in an egg tray and tilting them uniformly at suitable intervals.

A further object is to provide improved means for supporting the egg holding cages removably from a tray frame, each cage being formed to facilitate candling operations by holding the eggs in straight rows, with each cage of a convenient size for manipulation over a source of light, and all of the eggs exposed to rays of light from a source beneath the cage; also to provide cages which may be independently removed for filling or candling purposes, and then replaced, all without material time consuming manipulation.

A still further object of my invention is to provide simple, sanitary, durable and efficient egg holding and tilting means for incubators designed to contain multiple egg trays or tray frames.

In the drawings.

Like parts are identified by the same reference characters throughout the several views.

Figure 1:
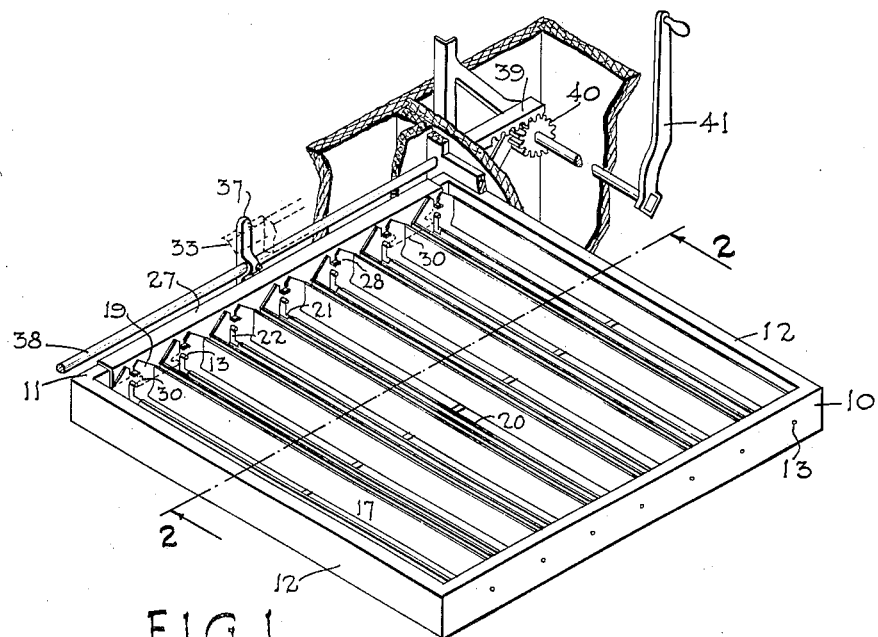
Figure 1 is an isometric view of an egg tray, with associated egg holding and egg tilting mechanism embodying my invention.

The tray frames comprise front and rear bars 10 and 11, connected by the side bars 12 to make a rectangular, preferably square, frame. Each of the bars 10 and 11 is provided with a series of inwardly projecting studs formed by inserting pins 13 through the bars at suitable intervals, the inner ends of these pins constituting the studs. The studs projecting inwardly from the front bar are axially aligned in pairs with corresponding studs projecting inwardly from the rear bar, whereby each pair of studs so axially aligned may serve as pivotal supports for an egg holding cage, which will now be described.

The egg holding cages have side walls 17 of a generally arcuate form in cross section. The lower margins of each of these walls are turned to form strengthening flanges 18. The walls 17 are otherwise concavo-convex in form, with their concave surfaces opposed or faced inwardly and pitched divergently from their lower to their upper margins, the ends of the walls being secured to the end walls 19 of the cage. The end walls are also connected along their lower margins by a centrally disposed angle bar 20, having the form of an inverted V in cross section. The side walls 17 and walls 19 and the angle bar 20 form the egg receiving cage.

Figure 5:
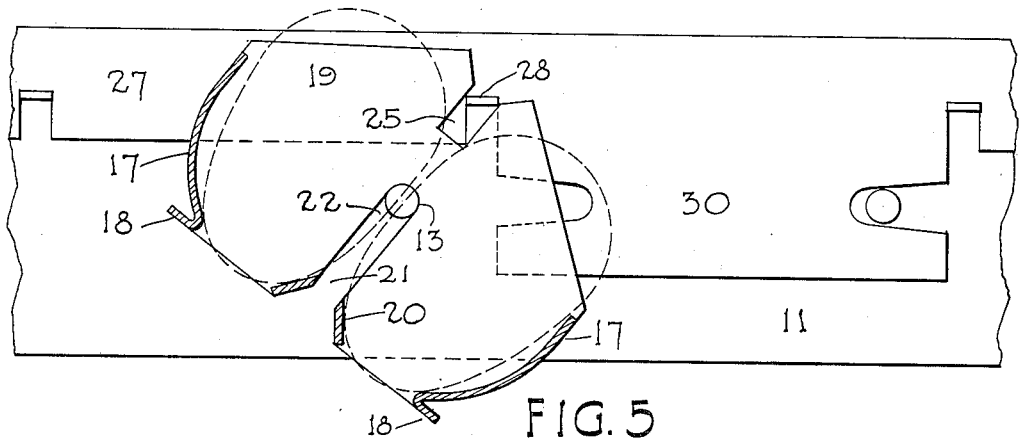
Figure 5 is a sectional view, drawn to line 5—5 of Figure 3.
Figure 6:
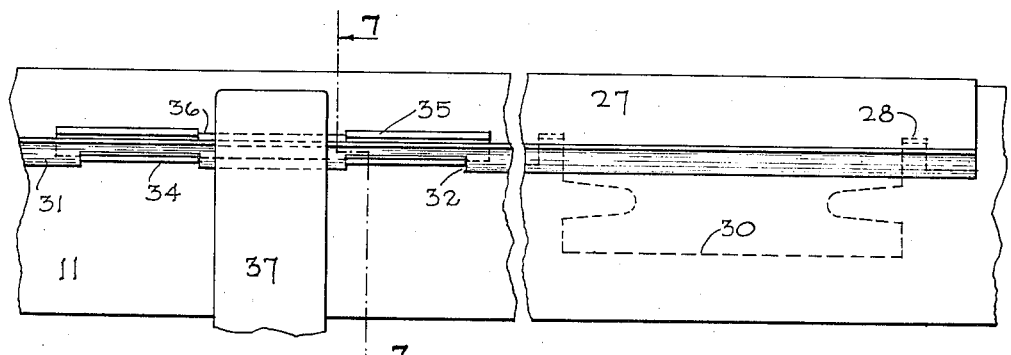
Figure 6 is a rear elevation of a fragment of one of the trays and associated tilting slide.

The bar 20 has its ends notched or cut away at the apex of the bar as indicated at 21 in Figure 5. Each end wall 19 of the cage is provided with a slot 22 extending upwardly from its lower margin, such margin being preferably provided with a V-shaped notch corresponding with the contour of the bar 20. The slot 22 is adapted to receive one of the studs or pins 13, whereby the cage may be supported with its opposite end similarly supported by the corresponding stud of the pair.

The side wall strips 17 of the cage have their lower margins so spaced from the intermediate V-shaped bar 20 as to support rows of eggs along each side of said bar 20, each cage being thus adapted to support two rows of eggs. The eggs are loosely supported and the cages are sufficiently open to allow air to circulate freely about the eggs. In the construction shown, seven of these egg cages are thus mounted in one tray frame parallel with each other and extending from front to rear. Each tray frame will thus contain fourteen rows of eggs. The means for tilting these cages with their contained eggs will now be described.

It will be observed that each of the end walls of the egg cages is provided with a notch 25 extending downwardly in the wall from its upper margin and substantially in line with the slot 22. A sheet metal channel-shaped slide 27 is adapted to fit over the upper margin of the tray frame and between it and the upwardly projecting marginal portions of the associated egg cages, the inner wall of the slide being provided with projections 28 positioned for entry in the notches 25 of the end walls of the cages. At intervals these slides may be provided on their inner side with guiding extensions 30, which furnish side bearings, both vertically and laterally, to prevent the slide 27 from tilting upon the upper margin of the tray frame. The ends of these projections 30 may be notched to prevent them from interfering with the movement of the slide, if one of the studs 13 should be otherwise in the path of the portion 30.

Figure 4:
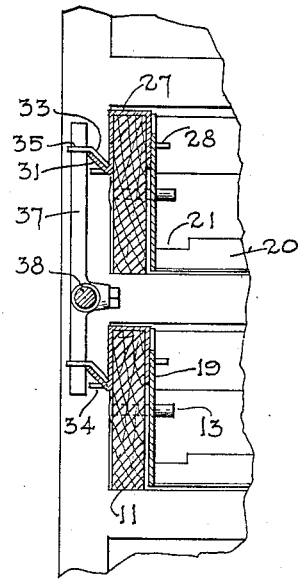
Figure 4 is a sectional view, drawn generally to line 4—4 of Figure 3.
Figure 7:
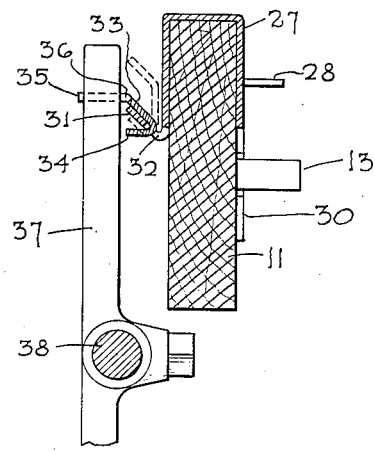
Figure 7 is a sectional view of the rear wall or member of the tray frame and associated slide, drawn to line 7—7 of Figure 6.

On the outer side, the vertical wall of the slide 27 has its lower marginal portion 31 turned obliquely outwardly and upwardly, as best shown in Figures 4 and 7, forming with the vertical portion a V-shaped channel and provided at intervals with slots 32, in which a coupling plate 33 may be loosely engaged, said coupling plate having lips 34 which extend through the slots 32 and are bent to form retaining hooks for the coupling member.

The upper margin of the coupling member has its end portions 35 outwardly turned and its middle portion notched at 36 to receive an operating arm 37, carried by a horizontally extending rod 38 connected with an exterior operating rack bar 39, which may be actuated by the pinion 40 and crank 41.

When the tray is placed in the incubator, if the operating arm 37 fails to register with the notch 36, the coupling member 33 will be pushed backwardly to the dotted line position in which it is illustrated in Figure 7, where it will remain until the rack bar 39 and rod 38 are shifted by the pinion and crank to bring the arm 37 into registry with the notch. The coupling member 33 will then drop by gravity to the position by which it is indicated by full lines in Figure 7, after which a continued movement of the rod 38, in either direction, will be transmitted to the slide.

Figure 2:
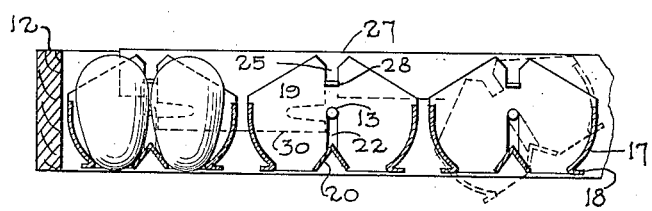
Figure 2 is an enlarged fragmentary sectional view drawn generally to line 2—2 of Figure 1, with dotted lines indicating one of the egg holding cages in a tilted position.
Figure 3:
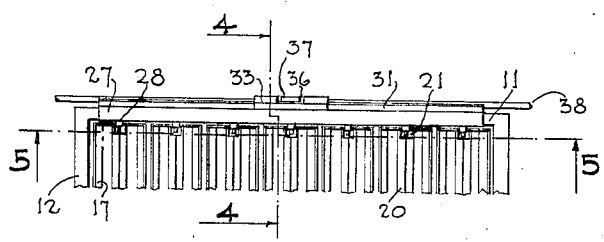
Figure 3 is a fragmentary plan view of a portion of one of the egg trays and associated tilting mechanism.

Whenever the slide 27 has been engaged by an operating arm 37, it may be actuated to tilt all of the egg supporting cages carried by the associated tray frame. The cages may thus be tilted to the dotted line position of Figure 2, or reversely tilted to the full line position of Figure 5, thus turning or tipping the eggs sufficiently to keep the nuclei from settling out of place.

The front and rear walls or bars of the tray frame are exactly alike, and the ends of the egg cages are exactly alike. Therefore the slide 27 may be applied to either wall 10 or 11, with equal facility, and when the tray is inserted, the wall which carries the slide will be regarded as the rear wall and will be pushed into the incubator first. This effects a saving of considerable time in the operation of large incubators containing many trays to be handled. Assuming that the incubating chamber contains a series of trays in superposed relation to each other, as indicated in Figure 4, the operating arm 37 may be extended upwardly and downwardly from the rod 38, whereby a plurality of slides 27 may be simultaneously shifted from a single rod 38.

It will be noted that the slide not only acts as a shifter to tilt the egg cages, but it also serves to hold the egg cages in their tilted position by reason of the fact that the slide projections 28 are engaged in the notches 25 in the end walls of the cages. These projections can be inexpensively formed by splitting the material composing the inner wall of the slide and bending the material between two slits outwardly in the form of a projecting lip.

The separately insertible cages facilitate candling operations, each row of eggs being exposed to rays of light from below, which pass through the slots formed by spacing the central bottom bar from the lower margins of the side walls. The eggs being in rows, none are apt to be missed during a candling operation, and each cage is of a convenient size to be handled and manipulated over the lamp for candling the rows of eggs successively. The trunnions and trunnion receiving slots afford convenient means for quick removal and replacement of successive cages.

By mounting each cage to oscillate about an axial line which extends longitudinally of the cage in proximity to, but slightly above, its center of gravity, the power required for tilting is reduced to a minimum and maximum tilting or turning effects upon the eggs are obtained, consistent with stability in operation.

It will be observed that all portions of the egg cages are included within the space between the upper and lower margins of the tray frames. This makes it possible to remove a series of tray frames and stack them one upon another preparatory to filling the cages with eggs, or for any other purpose where economy of space or convenience resulting from the piling of one tray upon another, becomes important.

I claim:

1. An egg supporting cage for incubators, comprising the combination with a pair of end walls, of a set of sheet metal walls, arcuate in cross section and upwardly divergent, and a co-operating longitudinally extending central bottom bar composed of convergent ridge forming members spaced from the side walls connecting the end walls and co-operating with the side walls to support parallel rows of eggs of various sizes in substantially fixed relation to each other.

2. An egg supporting cage for incubators, comprising the combination with a pair of end walls having open ended slots extending upwardly from their bottom margins, of a set of sheet metal walls, arcuate in cross section and upwardly divergent, and a co-operating longitudinally extending central bottom bar, having convergent ridge forming sides also connecting the end walls and co-operating with the side walls to support parallel rows of eggs, in a substantially fixed relation to each other together with a tray frame having pairs of trunnions engageable in said slots, and the ends of the bottom bars being cut away to allow the trunnions to enter the slots to engage the ends of parallel egg trays, the axes of said trunnions being in lines adjacent to the centers of gravity of their respective cages, and means, associated with the cages, for simultaneously tilting them about said axes in opposite directions from vertical planes through said axes.

3. An incubator egg tray, comprising the combination with a tray frame provided with spaced trunnions projecting inwardly from its front and rear walls and axially aligned in pairs, egg receiving cages, each having notched end walls, and adapted to be supported within the tray frame when a pair of trunnions are engaged in the end wall notches, said notches having the form of open ended slots adapted to allow the cages to move downwardly to a point with their centers of gravity slightly below the level of the trunnions, and a slide removably mounted upon one wall of the tray frame and loosely engageable with the cages to tilt the same upon said trunnions, said slide having portions adapted to ride upon the ends of the cages into position for interlocking engagement therewith during cage tilting movements of the slide, whereby each of the cages is made independently removable.

4. An incubator egg tray comprising the combination with a tray frame provided with spaced trunnions projecting inwardly from its front and rear walls and axially aligned in pairs, egg receiving cages, each having notched end walls and adapted to be supported within the tray frame when a pair of trunnions are engaged in the end wall notches, said notches having the form of open slots adapted to allow the cages to move downwardly to a point with their centers of gravity slightly below the level of the trunnions, and a slide mounted upon one wall of the tray frame and automatically engageable with the cages when moved along said wall to tilt the same upon said trunnions, when the slide is actuated each cage being formed of sheet metal strips adapted to allow rows of eggs to become loosely wedged between them and between which strips air may circulate throughout the egg receiving space.

5. An incubator egg tray, comprising the combination with a tray frame having inwardly projecting pairs of trunnions, and egg supporting cages having end walls provided with open ended slots extending upwardly from the bottom margins of the end walls and adapted to receive said trunnions, said end walls being also formed with beveled margins and an intermediate notch for interlocking engagement with a slide actuator, and a slide actuator carried by the tray frame and formed to ride over said beveled margins and loosely interlock with the notched end walls of the cages, and to tilt the same about the axes of said trunnions.

6. An egg tray for incubators comprising the combination with a tray frame, of a series of elongated parallel egg cages, each adapted to loosely support two rows of eggs, each cage having a central bar downwardly pitched in opposite directions from a longitudinal center line in the lower portion of the cage, and side bars of sheet metal, arcuate in cross section, with lower portions convergent toward said central bar and co-operative therewith for supporting rows of eggs between them and the central bar, the space between the side and central bar portions being open and unobstructed, whereby eggs of differing sizes may each find its own anchorage between such convergent portions and be held with stability when the cage is laterally tilted.

7. An incubator egg tray, comprising the combination of a series of longitudinally elongated egg supporting cages having end walls provided with upwardly extending open ended trunnion receiving slots and downwardly extending open ended slide receiving notches.

8. An incubator egg tray, comprising the combination with a tray frame, of a series of elongated egg receiving cages having end walls provided with upwardly extending open ended trunnion receiving slots and downwardly extending open ended slots to receive an actuator, trunnions carried by the tray frame in positions for registry with the upwardly extending slots, and a slide carried by the tray frame and provided with projections adapted to be engaged in said notches, whereby a movement of the slide will cause a tilting movement of each egg cage upon its supporting trunnions, said slide being longitudinally channeled to receive one wall of the tray frame and having the outer wall of the channel provided with a coupling member adapted to be engaged by an operating rod.

9. In an incubator egg supporting and egg tilting mechanism, the combination of an egg tray frame provided with a series of parallel egg cages separately connected with the front and rear walls of the frame and independently removable therefrom, by mere manipulation, a slide carried by one of said frame walls and adapted for interlocking engagement with the egg trays, an actuating rod extending along the slide carrying wall of the tray frame and provided with a slide actuating arm, and an oscillatory coupling member carried by the slide in a position for interlocking engagement with said arm.

10. In an incubator egg supporting and egg tilting mechanism, the combination of an egg tray frame provided with a series of parallel egg cages separately connected with the front and rear walls of the frame and independently removable therefrom, a slide carried by one wall of said frame and adapted for interlocking engagement with the egg trays, an actuating rod extending along the slide carrying wall of the tray frame and provided with a slide actuating arm, and a yieldable coupling member carried by the slide and adapted to automatically engage said operating arm in one position of relative adjustment of the arm and slide.

11. An incubator egg supporting and egg tilting mechanism, comprising the combination of parallel egg supporting cages independently pivoted to the tray frame and independently removable therefrom, each egg supporting cage being adapted to receive two rows of eggs in parallel relation to each other and extending from points adjacent to the front and rear walls of the tray frame across the space between them, and an independently movable and removable slide mounted upon the upper margin of one tray wall and engageable with said cages to tilt them upon their pivotal axes, said slide, when removed, permitting removal of individual cages.

12. In an incubator egg tray the combination with a tray frame, of a channeled egg tilting slide mounted upon and loosely embracing one wall of the frame, and egg supporting means engageable by said slide for tilting the eggs.

13. In an incubator egg tray the combination with a tray frame, of a channeled egg tilting slide mounted upon one wall of the frame and provided with interior projections for oscillating egg supports within the tray, an exterior coupling, and a slide actuator extending along one side of the tray, and engageable with the coupling by axial movement, said coupling being automatically movable transversely of the slide actuator to engage the same.

14. An incubator egg tray having a series of independently removable egg cages supported for oscillation about longitudinal axial lines passing near their respective centers of gravity, and adapted to support substantially parallel rows of eggs, the bottoms of said cages being sufficiently open to permit candling operations and to allow eggs of differing sizes to find anchorage at the margins of the openings, whereby each egg may be supported in substantially fixed relation to the cage.

15. In an incubator egg tray, the combination with a tray frame and a set of separately removable egg receiving cages having upwardly convergent upper margins provided with means for engagement of an actuating slide therewith, of a slide associated with one wall of the tray frame and adapted to automatically engage an unconnected cage by movement along its upper margin to said means for permitting slide engagement.

16. In an incubator egg tray, the combination with a tray frame and a set of separately removable egg receiving cages, of a slide associated with one wall of the tray frame and adapted to automatically move transversely into engagement with unconnected cages when the latter are in position within the frame, a slide actuator movable along one side of the slide, and automatically acting coupling means movable transversely of the slide and its actuator for operatively connecting them with each other when the actuator is being moved independently of the slide.

17. An incubator egg tray having like front and rear walls in combination with a series of longitudinally elongated egg supporting cages, each having like end walls provided with upwardly extended, open ended trunnion receiving slots and downwardly extended, open ended slide receiving notches, a channel shaped slide adapted to be mounted upon either of said walls and to receive such wall in its channel, said slide having projections adapted to engage in the downwardly extending slots of the respective cages at either end thereof, and the outer wall of the slide channel being provided with means for coupling it to a slide actuator.

18. An incubator egg tray having like front and rear walls in combination with a series of longitudinally elongated egg supporting cages, each having like end walls provided with upwardly extended, open ended trunnion receiving slots and downwardly extended, open ended slide receiving notches, a channel shaped slide adapted to be mounted upon either of said walls and to receive such wall in its channel, said slide having projections adapted to engage in the downwardly extending slots of the respective cages at either end thereof, and the outer wall of the slide channel being provided with means for coupling it to a slide actuator, each end wall of each cage being also provided with inclined margins along which the slide projection may move to a position of engagement in the downwardly extending slot for automatically coupling the slide to the cage when the slide is reciprocated by its actuator.

19. In an egg tray, a series of tiltable egg supporting cages, in combination with a slide mounted upon one wall of the tray and having portions extending downwardly along one side of the wall for engagement with the cages and another portion extending downwardly along the other side of the wall for engagement with an actuator.

20. In an egg tray, a series of tiltable egg supporting cages, in combination with a slide mounted upon one wall of the tray and having portions extending downwardly along one side of the wall for engagement with the cages and another portion extending downwardly along the other side of the wall for engagement with an actuator, said last mentioned portion having its lower margin provided with an outwardly and upwardly projecting flange, and a gravity actuated coupling member loosely interlocked with said flange and adapted to be lifted and allowed to drop into interlocking engagement with a slide actuator movable along a path normally occupied by portions of the coupling members.

21. An egg supporting cage for incubators, comprising the combination with end walls, of side and bottom members for said cage connecting the end walls and adapted to hold parallel rows of eggs in spaced relation to each other, the bottom member comprising upwardly convergent walls having their lower margins spaced from the side members to provide open bottoms into which various size eggs can seat in substantially fixed relation.

22. An egg tray provided with parallel cages, each provided with means for supporting two rows of eggs and each having its egg supporting bottom formed of upwardly divergent egg supporting walls, said divergent walls forming the sole support for eggs of various sizes to prevent lateral shifting of the eggs.

23. In an egg tray, an egg cage adapted to support parallel rows of eggs in positions to facilitate candling operations, each cage having its bottom formed of upwardly divergent egg supporting walls to engage and support eggs of various sizes at opposite points, said walls being laterally spaced apart to provide an unobstructed open bottom into which eggs of various sizes can project to find secure anchorage upon said divergent walls against lateral shifting.

GEORGE T. MARKEY.